Patented Sept. 21, 1954

2,689,836

UNITED STATES PATENT OFFICE 2,689,836

PROCESS OF PREPARING POLYMERS CONTAINING PLASTICIZERS

Gerhard Bier, Frankfurt am Main-Hochst, Germany, assignor to Farbwerke Hoechst Aktiengesellschaft vormals Meister Lucius und Bruning, Frankfurt am Main-Hochst, Germany, a company of Germany No Drawing. Application March 6, 1951,
Serial No. 214,219

Claims priority, application Germany
March 14, 1950

8 Claims. (Cl. 260—30.6)

In commerce, many synthetic polymers are used in combination with plasticizers. Thus, there is a wide field of application for polyvinyl chloride and copolymers of vinyl chloride together with other compounds capable of copolymerization, such as organic vinyl esters, as dichlorethylene or the like, in the production of foils and compositions for cables by combining the polymers with suitable plasticizers. The preparation of such plasticized masses may be effected in various ways. Generally, the solid polymers are homogenized with the liquid plasticizers on rollers or in kneading machines at elevated temperatures. In order to obtain complete gelatinization and uniform products, for instance with polyvinyl chloride, it is necessary to work at 160° C.

Attempts have already been made to simplify the preparation of polymers containing plasticizers by polymerizing vinyl compounds in the presence of plasticizers and in the absence of diluents or in organic solvents. The industrial preparation and processing of such masses, however, is complicated and uneconomical. If one tries to effect the polymerization of vinyl chloride, either per se or in mixture with other monomers, in the form of an aqueous emulsion in the presence of plasticizers, formation of lumps or agglutination occurs.

Now, I have found that self-depositing polymers and co-polymers of vinyl chloride, containing plasticizers, may be obtained in a simple and inexpensive way by carrying out the polymerization in an aqueous medium while simultaneously introducing the monomer or a mixture of monomers and the plasticizer pari passu with their consumption.

The simultaneous addition of monomer and plasticizer is indispensable for obtaining a uniform distribution of the plasticizer in the individual particles of the polymer. The monomer and the plasticizer may be introduced separately into the aqueous medium. It is, however, advisable to mix the monomer and the plasticizer prior to the polymerization and to run the mixture into the reaction vessel.

Since self-depositing polymers must be obtained according to the present invention, the process must be carried out under such conditions as to permit of such products being obtained. The measures chosen must be so that, on the one hand, the polymers do not form lumps and, on the other hand, no substantial amounts of stable dispersions are produced. These conditions are generally known. They can easily be ascertained in each particular case by respective tests. Thus, for instance, the polymerization may be effected in the presence of water-soluble protective colloids such as polyvinyl alcohol or copolymers of maleic acid and vinyl compounds in the form of their alkali or ammonium salts. Also the addition of small quantities of emulsifiers is suitable if desired, in conjunction with electrolytes. In all cases, care must be taken that the formation of substantial quantities of not self-depositing particles of the polymer is avoided, such dispersions, as above mentioned, having the tendency to coalesce into lumps with the plasticizer and to agglutinate. The size of the particles of the self-depositing plasticizer-containing polymer, which particles may easily be removed by filtration or washing, may vary within wide limits. Thus, for instance, the polymers may be obtained in granular or globular form or as fine powders.

Suitable protective colloids are for instance:

Polyvinyl alcohol as well as its water-soluble derivates, for instance, partially esterified, etherified or acetalized polyvinyl alcohols; soluble salts of polyacrylic acid or polymethacrylic acid, soluble salts of copolymers of maleic acid with other copolymerizable unsaturated compounds such as styrene or vinyl acetate; furthermore, gum tragacanth, gelatine, alginates, water-soluble cellulose derivatives such as water-soluble cellulose ethers and salts of cellulose glycolic acids. As emulsifiers there may be used, for instance: salts of sulfonic acids of paraffin hydrocarbons with about 8–20 carbon atoms (obtainable for instance by treatment of hydrocarbons with $SO_2$ and $Cl_2$ and hydrolysis of the sulfochlorides formed), alkyl-benzene sulfonic acids whose alkyl radicals have about 4–20 carbon atoms and their salts, sulfuric acid esters of fatty alcohols of high molecular weight, such as octadecylsulfonate, and their salts, higher-molecular weight alkyl sulfamido acetic acids and their salts. The alkali salts of these acids are good emulsifiers. By adding to the aqueous phase suitable quantities of appropriate salts of precipitating action, for instance $NaCl$, $Na_2SO_4$, $CaCl_2$, $MgSO_4$, $Al_2(SO_4)_3$, self-depositing polymers are obtained. This combination of emulsifier and salt is very advantageous in the preparation of plasticized polymers of vinyl chloride or its copolymers.

The process of the present invention may be carried out with all plasticizers customarily used in working up polymers or copolymers of vinyl chloride, for instance with: tricresyl phosphate (advantageously free from cresol), triphenylphosphate, tri-(2-ethyl-hexyl)-phosphate, phthalic esters such as dibutyl phthalate, di-(2-ethylhexyl)-phthalate or phthalic esters of other alcohols (advantageously such as do not polymerize); di-esters of adipic or sebacic acid with alcohols containing at least 5 carbon atoms, for instance 2-ethyl-hexanol-1; copolymers of acrylonitrile with butadiene; poly-esters such as, for instance, the poly-esters obtainable from propylene glycol and adipic acid. Plasticizers which, by their chemical constitution, inhibit the polymerization, are not suitable for the purpose in question. Also mixtures of plasticizers may be applied with special success.

The proportions of the plasticizers may vary within wide limits according to the monomers used and the desired properties of the final products obtained. In general, about 30 to about 100%, calculated upon the monomer or the monomers, will be used. In the case of copolymers from vinyl chloride with vinyl acetate or of other copolymers which as such are already rather soft, small quantities of plasticizers will be chosen. Care must also be taken that the plasticizer is not used in a portion greater than that which will dissolve in the vinyl chloride or in the mixture of monomers. This applies above all to plasticizers of high molecular weight. In such cases it is possible to incorporate increased amounts of the plasticizer with the monomers by adding to the monomers suitable solvents which do not essentially disturb the polymerization, for instance, acetone, ethyl acetate.

Suitable polymerization catalysts are: peroxides, such as hydrogen peroxide, benzoyl peroxide, furthermore, azo compounds such as azo-isobutyric acid nitrile. There may, however, also be used the other catalysts usually applied in the polymerization and copolymerization of vinyl chloride. Of special advantage are the known redox systems.

According to its nature, the catalyst may be introduced into the aqueous polymerization medium either per se or in admixture with the monomer or monomers. Thus, for instance, a mixture of benzoyl peroxide and vinyl chloride may be caused to run into the aqueous liquor containing, if desired, a reducing agent; or a suitable peroxide may be introduced into the aqueous polymerization medium and the reducing agent be added either per se or mixed with the monomer. It is very advantageous to proceed as follows: the entire reducing agent or the entire oxidizing agent is entered into the reaction vessel and the other component of the redox system is added to the batch at such a rate that the simultaneously added monomer polymerizes. It is, however, not advisable to add the hydrogen peroxide which is insoluble in vinyl chloride to the vinyl chloride; on the contrary, it should be added gradually and separately from the monomer in such quantities that the polymerization proceeds continuously at the desired rate.

According to this invention, the polymerization may also be carried out in the presence of pigments, soluble or insoluble dyestuffs so far as they have no inhibiting action. Moreover, it is possible to add, prior or during the polymerization, non-inhibiting substances which render the polymers stable to the detrimental action of light and/or heat.

Monomers which, according to this invention, may be polymerized together with vinyl chloride are, for instance: vinyl esters, such as vinyl acetate, vinyl propionate, vinyl butyrate, vinyl benzoate; acrylates such as acrylic acid methyl ester and acrylic acid ethyl ester; methacrylates such as methacrylic acid methyl-, ethyl-, propyl-, and butyl-esters; furthermore, styrene, acrylonitrile, maleic acid or fumaric acid compounds, such as maleic acid diethyl ester. There come into consideration principally those copolymerizates in which the proportion of the vinyl chloride amounts at least to about 80%.

It is advantageous, to carry out the polymerization approximately at the concentration at which the organic phase (monomer and plasticizer) is saturated in the aqueous phase or below the saturation concentration.

The concentration can easily be recognized by measuring the pressure in the reaction vessel, i. e. by means of calibrating tests.

By continuously adding the aqueous phase as well as the mixture of monomer and plasticizer and simultaneously removing the polymers and the spent liquor, it is possible without difficulty to perform the process continuously. It is surprising and it could not be forseen from previous experience that it would be possible to obtain in one operation plasticizer-containing polyvinyl chloride polymers and corresponding copolymers in a finely divided non-agglutinating state. The great advantage of the process according to this invention resides in the fact that the plasticized polymers or copolymers of vinyl chloride are obtained in the form of fine grains, fit for shipment, which may be processed without homogenizing and in a short time by means of calenders or molding presses to form finished articles such as foils, tubes and other molded pieces.

The following examples serve to illustrate the invention but they are not intended to limit it thereto, the parts being by weight unless stated otherwise:

(1) 15,000 parts of distilled water, 30 parts of crystalline sodium acetate, 10 parts of glacial acetic acid, 200 parts of 30% sodium alkyl sulfonate (alkyl=hydrocarbon radical with about 8–20 carbon atoms with as few ramifications as possible), 50 parts of $MgSO_4.7H_2O$, 20 parts of sodium formaldehyde sulfoxylate (80%), 1 part of crystalline ammonium ferrous sulfate are introduced into a vessel provided with a stirrer. The air is displaced by nitrogen. 3,500 parts of vinyl chloride and 1,500 parts of (di-2-ethyl-hexyl-1)-phthalate are introduced into the supply vessel. Into a further supply vessel 1,000 parts of a 0.3% $H_2O_2$-solution are introduced. The monomer and the plasticizer are run into the vessel at 25° C. and the $H_2O_2$-solution is dropped in such manner that a gauge pressure of about 3.4 atmospheres is produced and the heat of reaction is removed by jacket cooling. The polymerization is finished within 3 hours. A fine plasticized polyvinyl chloride powder is obtained which is filtered, washed and dried at 60° C. It does not bake together. When applied on a roller at 160° C., the dried powder is at once transformed into a sheet.

(2) One proceeds as indicated in Example 1, but replaces the magnesium sulfate by 30 parts by volume of a 20% $CaCl_2$-solution.

(3) 16,000 parts of water, 30 parts of cryst. sodium acetate, 10 parts of glacial acetic acid, 200 parts of sodium alkyl sulfonate (alkyl=hydrocarbon radical with about 8–20 carbon atoms), 40 parts by volume of a 20% $CaCl_2$-solution, 20 parts of sodium formaldehyde sulfoxylate, and 1 part of cryst. ammonium ferrous sulfate are introduced into a stirring vessel. 3,300 parts of vinylchloride, 200 parts of vinyl acetate and 1,500 parts of tricresyl phosphate are introduced into the supply vessel for the monomer. The polymerization is carried out as described in Example 1 at a gauge pressure of about 3.5 atmospheres.

(4) 20,000 parts of water, 30 parts of sodium acetate, 10 parts of glacial acetic acid, 50 parts of sodium alkyl sulfonamido-acetate (alkyl=hydrocarbon radical with about 8-20 carbon atoms), 15 parts of $CaCl_2$, 20 parts of 30% $H_2O_2$ are introduced into an autoclave provided with a stirrer. 4,250 parts of vinyl chloride, 750 parts of vinyl 15 parts of $CaCl_2$, 20 parts of 30% $H_2O_2$ are introduced into the supply vessel for the monomer. A 1% solution of sodium hyposulfite is introduced in the supply vessel for the activating substances. Polymerization is effected under a gauge pressure of about 3.6 atmospheres and at a temperature of 30° C. and it is controlled by the gradual addition of the hyposulfite solution.

A product in the form of a well filterable grit is obtained.

(5) 20,000 parts of water, 30 parts of sodium acetate, 10 parts of glacial acetic acid, 200 parts of 30% sodium alkyl sulfonate (alkyl=hydrocarbon radical with about 8-20 carbon atoms), 60 parts of $MgSO_4 \cdot 7H_2O$, 20 parts of sodium formaldehyde sulfoxylate are introduced into a stirring vessel. 3,600 parts of vinyl chloride, 2,400 parts of phthalic acid di-(2-ethyl-hexyl-1)-ester are introduced into the supply vessel for the monomer. 10 parts of 30% $H_2O_2$-solution, 10 parts of N/10 caustic soda solution, 890 parts of water are introduced into the supply vessel for the activating substances. The polymerization is effected at a temperature of 25° C.–26° C. and under a gauge pressure of 2.8–2.9 atmospheres. The powdery product is obtained in a good filterable form and is dried at 55° C.

I claim:

1. A process as defined in claim 7 in which the mixture of vinyl chloride with a plasticizer is introduced into the aqueous polymerization medium pari passu with its consumption.

2. A process as defined in claim 7 in which the mixture of at least about 80% of vinyl chloride with at most about 20% of an unsaturated compound copolymerizable therewith is introduced, simultaneously with a plasticizer, into the aqueous polymerization medium.

3. A process as defined in claim 7 in which the copolymerizable compound is vinyl acetate.

4. A process as defined in claim 7 in which the plasticizer is di-(2-ethyl-hexy-1)-phthalate.

5. A process as defined in claim 7 in which the plasticizer is tricresyl phosphate.

6. A process as defined in claim 7 in which the plasticizer is a di-ester of a dicarboxylic acid of the group consisting of adipic and sebacic acid.

7. In a process for the preparation of polymers selected from the group consisting of polyvinyl chloride and copolymers of vinyl chloride with other polymerizable monomers, the improvement which comprises simultaneously introducing the monomeric constituent and a plasticizer therefor at the rate of their consumption into an aqueous polymerization medium including an emulsifier and as precipitant for the polymer, an inorganic water soluble salt of a cation selected from the group consisting of $Mg^{++}$ and $Ca^{++}$, and an anion selected from the group consisting of $Cl^-$ and $SO_4^=$, whereby self-depositing discrete particles of polymer are produced.

8. In a process for the preparation of polymers selected from the group consisting of polyvinyl chloride and copolymers of vinyl chloride with other polymerizable monomers, the improvement which comprises simultaneously introducing the monomeric constituent and a plasticizer therefor at the rate of their consumption into an aqueous polymerization medium including an emulsifier, a water soluble protective colloid selected from the group consisting of polyvinyl alcohol, the alkali metal salts of a copolymer of maleic acid and a vinyl compound, and the ammonium salt of a copolymer of maleic acid and a vinyl compound, and as precipitant for the polymer, an inorganic water soluble salt of a cation selected from the group consisting of $Mg^{++}$ and $Ca^{++}$, and an anion selected from the group consisting of $Cl^-$ and $SO_4^=$, whereby self-depositing discrete particles of polymer are produced.

References Cited in the file of this patent

UNITED STATES PATENTS

| Number | Name | Date |
|---|---|---|
| 1,259,180 | Schoenfeld | Oct. 14, 1941 |